US008981594B2

(12) United States Patent
Lin

(10) Patent No.: US 8,981,594 B2
(45) Date of Patent: Mar. 17, 2015

(54) ADVANCE POWER-SAVING POWER SOCKET FOR POWER SAVING SYSTEM

(75) Inventor: Shih-Jen Lin, Taipei (TW)

(73) Assignee: Global Win Technology Co., Ltd., Taipei (TW)

( * ) Notice: Subject to any disclaimer, the term of this patent is extended or adjusted under 35 U.S.C. 154(b) by 603 days.

(21) Appl. No.: 13/349,340

(22) Filed: Jan. 12, 2012

(65) Prior Publication Data

US 2013/0181524 A1 Jul. 18, 2013

(51) Int. Cl.
*H02J 3/14* (2006.01)

(52) U.S. Cl.
USPC .......... 307/39

(58) Field of Classification Search
USPC .......... 307/38, 39, 42, 117
See application file for complete search history.

(56) References Cited

U.S. PATENT DOCUMENTS 6,528,902 B1 * 3/2003 Barton .......... 307/39

* cited by examiner

*Primary Examiner* — Carlos Amaya
(74) *Attorney, Agent, or Firm* — Muncy, Geissler, Olds & Lowe, P.C.

(57) ABSTRACT

An advance power-saving power socket for power saving systems includes a socket body which includes an extension cord and has a master socket and at least one slave socket, wherein the slave sockets are connected in parallel with each other at first, and then connected in series with a slave socket temperature sensitive switch and linked with both ends of the power input end on the slave socket control loop. So the master socket is connected in series with the parallel-connected master socket temperature sensitive switch and first heater, and then connected in parallel with the power input end, so as to use the working temperature produced by the current flowing through the first heater of the master socket control loop for controlling over the closed or open state of the slave socket control loop and shunt the current of the master socket control loop.

7 Claims, 8 Drawing Sheets

| PAP | GP | Toff Power Consumption | Wm+s | Power Consumption by Host | GWT-Peripheral Load(s) | | | Master Socket(m) | | GWT-Peripheral Load Socket(s) | | | | | | Toff/sec |
|---|---|---|---|---|---|---|---|---|---|---|---|---|---|---|---|---|
| Kwhr/day | Whr/天 | Whr/day | Whr/day | Wm | Ws1 | Ws2 | Ws3 | Vm | Am | Vs1 | As1 | Vs2 | As2 | Vs3 | As3 | at0.35a |
| Am<0.5amp Some of Socket are not compared as they cannot start peripherals | | 0.0 | 230 | 23.0 | 0.0 | 0.0 | 0.0 | 110.9 | 0.207 | 0.0 | 2.2 | 0.0 | 4.4 | 0.0 | 6.6 | 0 |
| | | 0.0 | 372 | 37.2 | 0.0 | 0.0 | 0.0 | 110.4 | 0.337 | 0.0 | 2.2 | 0.0 | 4.4 | 0.0 | 6.6 | 0 |
| | | 0.0 | 5,247 | 52.1 | 240.2 | 477.4 | 700.3 | 108.9 | 0.478 | 109.2 | 2.2 | 108.5 | 4.4 | 106.1 | 6.6 | 0 |
| 6.080 | 5,430 | 61.9 | 5,290 | 58.5 | 239.6 | 474.8 | 697.0 | 108.6 | 0.539 | 108.9 | 2.2 | 107.9 | 4.4 | 105.6 | 6.6 | 158 |
| 6.228 | 5,552 | 66.8 | 5,406 | 71.5 | 238.9 | 473.4 | 695.0 | 106.6 | 0.671 | 108.6 | 2.2 | 107.6 | 4.4 | 105.3 | 6.6 | 171 |
| 7.071 | 6,299 | 74.3 | 6,146 | 150.3 | 237.6 | 466.4 | 689.0 | 105.6 | 1.423 | 108.0 | 2.2 | 106.0 | 4.4 | 104.4 | 6.6 | 192 |
| 8.306 | 7,395 | 57.8 | 7,259 | 263.5 | 237.4 | 465.5 | 684.4 | 104.3 | 2.526 | 107.9 | 2.2 | 105.8 | 4.4 | 103.7 | 6.6 | 150 |
| 9.426 | 8,322 | 68.0 | 8,176 | 359.3 | 235.4 | 461.6 | 677.8 | 101.9 | 3.526 | 107.0 | 2.2 | 104.9 | 4.4 | 102.7 | 6.6 | 178 |
| 10.580 | 9,259 | 86.1 | 9,094 | 456.5 | 232.5 | 455.0 | 671.2 | 100.2 | 4.556 | 105.7 | 2.2 | 103.4 | 4.4 | 101.7 | 6.6 | 228 |

Toff:Time from host power-off to actual power-off of peripheral
Toff/0.35a:Time from host power-off to actual pwer-off of peripferals at standby current of 0.35A for peripherals
PAP:Total Power Consumption of Conventional Power Socket(Prior Art Power)
GP:GWTTotal Power Consumption of GWT Power Socket(GWT Power)

*FIG. 6*

| YP-GP | YP | $T_{off}$ Power Consumption | $W_{m+s}$ | Host(m) | Difference in Power Consumption | Y |
|---|---|---|---|---|---|---|
| Whr/天 | Whr/day | Whr/day | Whr/day | Am | Whr/day | Remarks |
| Am<0.5amp Some of Socket are not compared as they cannot start peripherals | | | 233 | 0.208 | 0.32 | S off |
| | | | 380 | 0.340 | 0.84 | S off |
| | | | 546 | 0.488 | 2.55 | S off |
| 45.1 | 5,475 | 0.4 | 5,396 | 0.545 | 2.45 | |
| 52.8 | 5,604 | 2.8 | 5,523 | 0.690 | 4.72 | |
| 104.0 | 6,403 | 2.8 | 6,322 | 1.476 | 10.00 | |
| 64.4 | 7,460 | 2.7 | 7,379 | 2.544 | 11.29 | |
| 123.0 | 8,445 | 2.7 | 8,364 | 3.596 | 20.08 | |
| 112.6 | 9,371 | 2.6 | 9,290 | 4.562 | 19.31 | |

YP:Y Socket Power

| PP-GP | PP | $T_{off}$ Power | $W_{m+s}$ | Host(m) | Difference in Power Consumption | P |
|---|---|---|---|---|---|---|
| Whr/day | Whr/day | Whr/day | Whr/day | Am | Whr/day | Remarks |
| Am<0.5amp Some of Socket are not compared as they cannot start peripherals | | | 932 | 0.204 | (0.86) | Warning |
| | | | ,081 | 0.335 | (0.96) | |
| | | | ,248 | 0.478 | (0.29) | internal |
| 13.5 | 5,444 | 0.6 | 5,365 | 0.545 | 0.82 | temperature |
| 1.6 | 5,553 | 0.6 | 5,474 | 0.682 | 2.60 | is |
| 74.2 | 6,373 | 0.6 | 6,294 | 1.487 | 9.44 | larger |
| 40.0 | 7,435 | 0.6 | 7,356 | 2.562 | 7.60 | than |
| 90.4 | 8,412 | 0.6 | 8,333 | 3.577 | 15.93 | >90℃. |
| 59.1 | 9,318 | 0.6 | 9,239 | 4.528 | 11.23 | |

PP:P Socket Power

*FIG. 7*

| PAP | | Total power consumption% | | | Power Consumption by Host% | | | Average Power Consumption of Peripherals% | | |
|---|---|---|---|---|---|---|---|---|---|---|
| (Whr/day) | Benchmark | Gt% | Yt% | Pt% | Gm% | Ym% | Pm% | Gs% | Ys% | Ps% |
| 6,080 | 100 | 89.3 | 90.0 | 89.5 | 9.6 | 10.0 | 9.8 | 77.4 | 78.7 | 78.5 |
| 6,228 | 100 | 89.1 | 90.0 | 89.2 | 11.5 | 12.2 | 11.9 | 75.3 | 76.4 | 76.0 |
| 7,071 | 100 | 89.1 | 90.6 | 90.1 | 21.3 | 22.7 | 22.6 | 65.7 | 66.7 | 66.4 |
| 8,306 | 100 | 89.0 | 89.8 | 89.5 | 31.7 | 33.1 | 32.6 | 55.7 | 55.8 | 55.9 |
| 9,426 | 100 | 88.3 | 89.6 | 89.2 | 38.1 | 40.2 | 39.8 | 48.6 | 48.5 | 48.6 |
| 10,580 | 100 | 87.5 | 88.6 | 88.1 | 43.2 | 45.0 | 44.2 | 42.8 | 42.8 | 43.1 |

*FIG. 8*

ADVANCE POWER-SAVING POWER SOCKET FOR POWER SAVING SYSTEM

BACKGROUND OF THE INVENTION

1. Field of the Invention

The present inventions relates to an advance power-saving power socket for power saving systems, particularly to a power socket that utilizes the temperature and current generated by the first heater of the first loop on the master socket control loop following power-on of the host of the electronic device to control over formation of a common closed circuit or open circuit on the slave socket control loop, in order to control one or more slave sockets on the slave socket control loop to make a closed or open circuit and further control over power supply to the electronic device and its peripherals that are connected electrically, thus achieving the purpose of saving power.

2. Description of the Related Art

Sets of electronic devices consisting of host computers and peripherals of various kinds, such as printers, scanners, loudspeakers and projectors, can give play to computers' functions in document handling, image or picture scanning and edition, compilation of briefings and projection films and other computational operations, etc. With assistance of peripherals of different kinds, these electronic devices can fulfill their tasks as expected. Yet, most of electronic devices need power supply to operate and keep performing their functions. Usually, the number of AC power sockets is limited and insufficient to meet the power supply requirements of many electronic devices in households. Therefore, to give play to functions of electronic devices, extended sockets with extension cords are selected to provide multiple outlets for connection with different types of electronic devices and supply electric power. However, these electronic devices in standby mode still consume some electricity, even though they are not powered on and used actually, and over a long period, these devices will consume a lot of electric power. Or when the hosts are in the standby mode or switched off, if power supply to the extension cords is not interrupted, peripherals of various kinds will still be in a standby mode and continues to consume electricity. Thus, the extension cords of electronic devices that supply power to computers and peripherals still have some disadvantages and problems in practice, for example:

(1) usually, extension cords are used in multiple electronic devices to supply power and connect host computers to peripherals, so when the host computers work, other peripherals must be supplied with electricity and powered on to work with the host computers. But when the host computers are in the standby mode or powered off without power supply, most of users will not switch off the peripherals one by one and interrupt the power supply. At this moment, the peripherals will be in standby mode and continuously consume electricity. (2) power-saving power sockets currently available in the marketplace require AC-DC voltage conversion by transformers and rectifiers before driving DC electronic components, such as transistors, integrated circuits and capacitors, etc. This leads to additional power consumption (This makes such electronic devices be kept in standby mode and a current of about 0.02 A to 0.045 A is kept flowing that continuously consumes electricity (about 2.28 watts=0.02 A×114V to 5.13 watts=0.045 A×114V, but it may vary since the extension cords available in the market have different circuit designs), thus wasting a lot of electric power), reduced power-saving effect and higher costs.

(3) for power-saving power sockets available in the marketplace, their control loops mostly consist of electronic components, such as transistors, integrated circuits, capacitors, etc. These electronic components have higher internal resistance than that of copper wires, and consume much electricity when switched on, even if power sockets for peripherals are switched off.

Thus, what the inventor and firms engaged in this field need urgently to research and improve is how to overcome the problems and disadvantages of standby power consumption of extension cords when connected by hosts and peripherals of electronic devices and necessity to power off and interrupt power supply to electronic devices that are not used.

SUMMARY OF THE INVENTION

In view of aforesaid problems and disadvantages, the inventor has collected related information, conducted assessments and taken considerations in many aspects, based on his experience of many years in this field and following continuous trials and corrections, and has finally invented an advance power-saving power socket for power saving systems that can control connection or disconnection of slave sockets to power supply by sensing the current flowing through an electronic circuit from the master socket and changes in temperature, thus achieving the purpose of saving power.

The primary object of the present invention is to install an extension cord used for connecting to external power supply on a socket body of the power-saving power socket, and install a master socket and at least one slave socket used for connecting a given electronic device electrically on the surface of the socket body, where the slave sockets are connected in series with a slave socket temperature sensitive switch and then connect with a power input end of a slave socket control loop, while the master socket is first connected in series with a parallel-connected master socket temperature sensitive switch and a first heater and then connected to the power input end, so as to control connection or disconnection of the slave socket control loop and shunt the current of the master socket control loop by utilizing the temperature generated by the current that flow through the first heater of the master socket control loop, thus achieving the power-saving effect.

The secondary object of the present invention is to make use of characteristics of impedance originally existing in electronic circuits and the closed-circuit temperature of temperature sensitive switches being higher than its open-circuit temperature, plus the setting that the closed-circuit temperature of the slave socket temperature sensitive switch is lower than that of the master socket temperature sensitive switch, to make the startup current flowing through the electronic circuit produce a given temperature to close the slave and master socket temperature sensitive switches in succession. When the host works, about 1 to 3 minutes later the slave socket temperature sensitive switch will be kept closed until the host shut down and the master socket temperature sensitive switch will be kept closed for most of the time. Under such circumstance, electricity will be supplied in a closed-circuit state at nearly zero impedance (i.e. nearly zero power consumption when the temperature of the temperature sensitive switch is higher than its closed-circuit temperature, till an open circuit is formed when the current is shunted, making the temperature of the master socket temperature sensitive switch is lower than its open-circuit temperature. Usually the closed-circuit temperature is 10° C. higher than the open-circuit temperature). Then the current will flow through the electronic circuit (e.g. first heater) and heats up the first heater again, until the temperature is higher than the close-circuit temperature of the master socket temperature sensitive switch and a closed circuit is made of the master socket temperature sensitive switch. As this cycle goes on, the power socket can consume less power than those power-saving power sockets that only use electronic circuits, make it more power-saving and environmental friendly.

A further object of the present invention is to make the first heater directly contacting with the temperature sensitive switch of the master and slave socket control loops and place all of them together into a heat insulation box to reduce heat dissipation performance from the master and slave socket temperature sensitive switches and extend the time of keeping the temperature sensitive switches closed, thus reducing the current that flows through the first heater and further achieving the energy-saving effect.

Another object of the present invention is to install an electronic switch, whose two contacts are connected in parallel with two terminals of the slave socket temperature sensitive switch of the slave socket control loop, while the trigger terminal of the electronic switch is connected in series with a current-limiting resistor and connected in parallel with the a first loop of the first heater; thus, a current flowing into the electronic switch is obtained by making the voltage of the first loop divided by limiting-current resistance to accelerate startup of the slave socket control loop.

A further object of the present invention is to install a normally open AC relay coil connected in series with the first heater in the power socket, where the normally open terminals of the relay are connected in parallel with the two terminals of the slave socket temperature sensitive switch on the slave socket control loop, so as to accelerate startup of the slave socket control loop by utilizing the current flowing through the coil of the normally open AC relay. At the same time, the temperature generated by the current flowing through the first heater of the slave socket control loop and the relay can be used to control connection or disconnection of the slave socket control loop and shunt the current of the master socket control loop and prevent the normally open AC relay from being burnt down due to too high temperature, thus achieving the effect of safety and power saving.

Yet a further object of the present invention is to completely cut off the power supply (the current is zero) in the socket body after the electronic device electrically connected to the master socket on the socket body is disconnected. Accordingly, no power (0 watt=114V×0.00 A at standby mode) is consumed and electricity is saved.

BRIEF DESCRIPTION OF THE DRAWINGS

FIG. 6 shows the gross power consumption of the present invention G, including 24-hour power consumption of the host, the peripherals and the present invention G.

FIG. 7 shows differences in power consumption between the Y brand socket, the P brand socket and the present invention G on a daily basis (YP-GP and PP-GP).

FIG. 8 shows comparisons of power consumption between the present invention G, the Y brand socket, the P brand socket and an ordinary power socket (calculated by percentage).

DETAILED DESCRIPTION OF THE PREFERRED EMBODIMENT

To achieve the aforesaid objects and functions as well as the techniques adopted in the present invention and its fabrication, examples of the preferred embodiments of the present invention are given below to illustrate features and functions of the present invention in detail by referring to the accompanying drawings.

Figure 1:
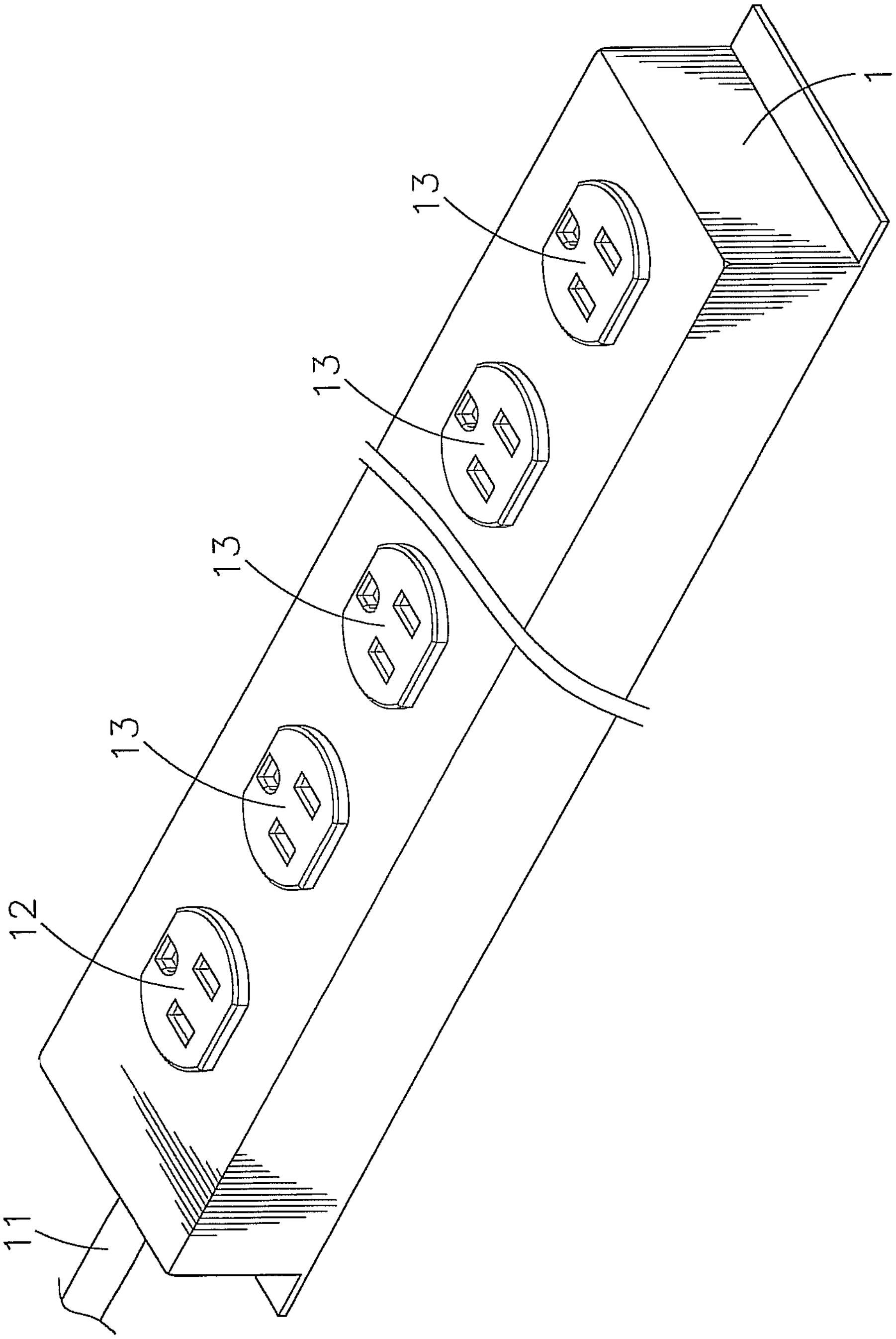
FIG. 1 is a perspective view of the present invention.
Figure 2:
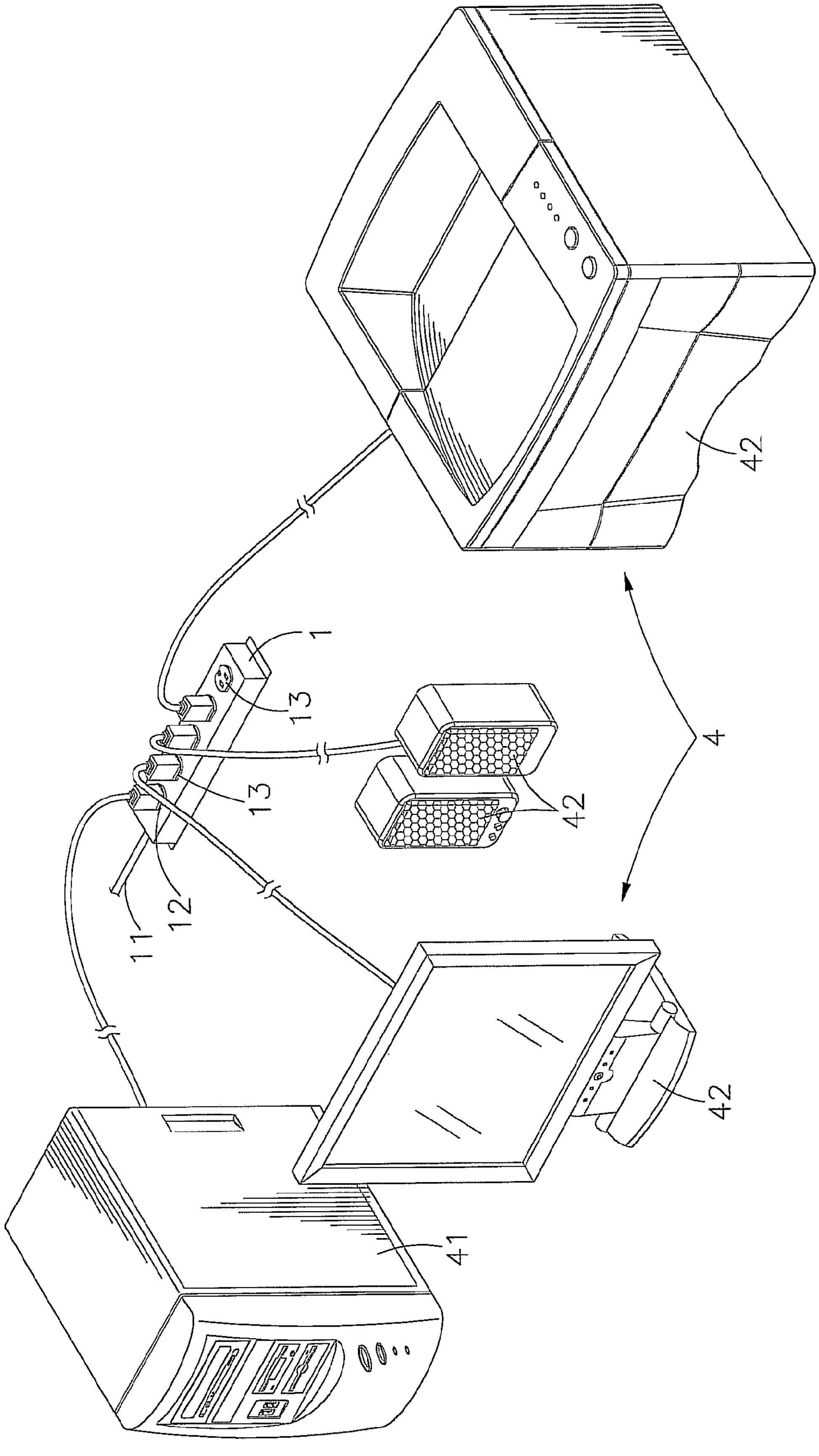
FIG. 2 is a perspective view according to a preferred embodiment of the present invention.
Figure 3:
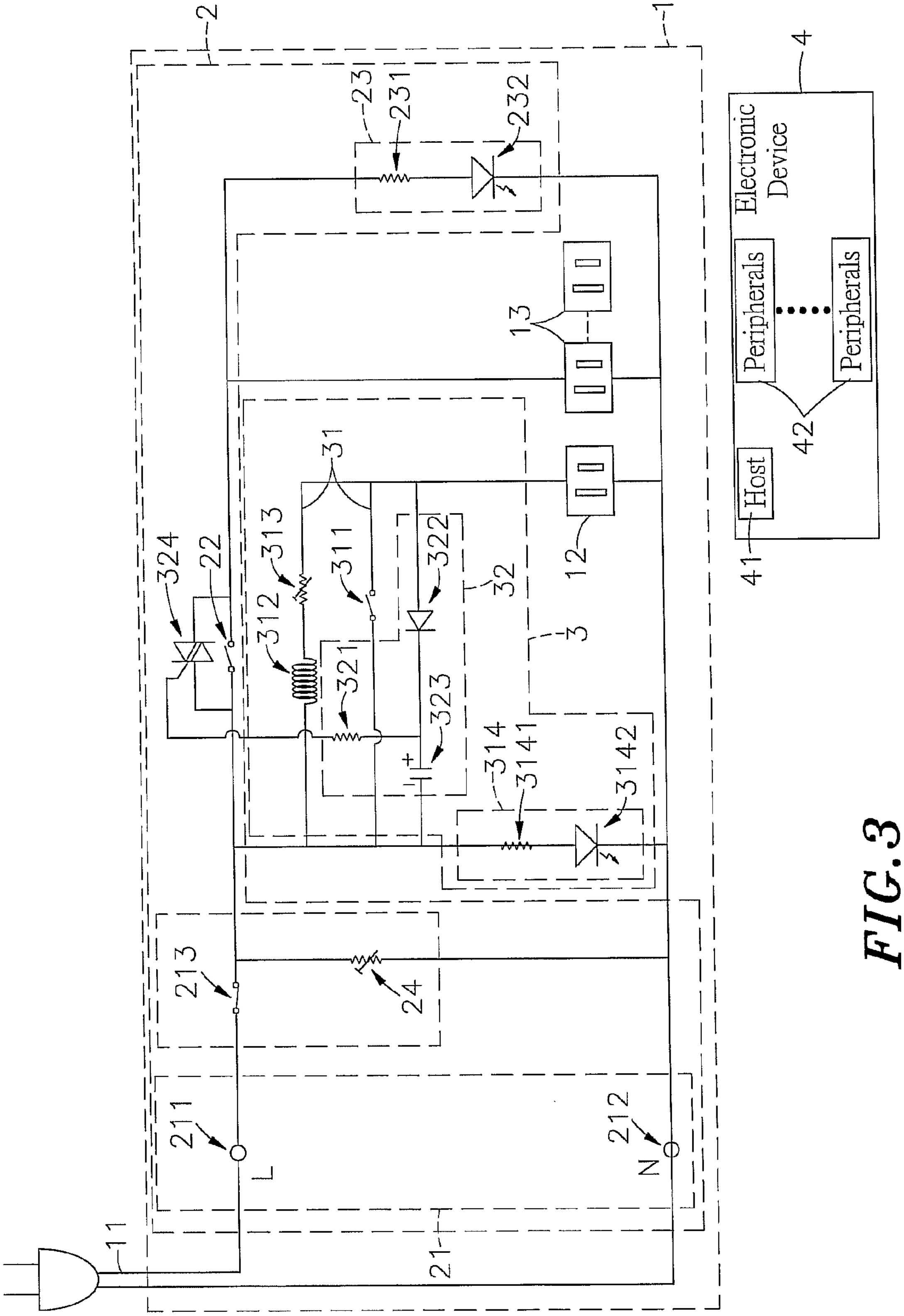
FIG. 3 is a simple circuit diagram according to another preferred embodiment of the present invention.
Figure 4:
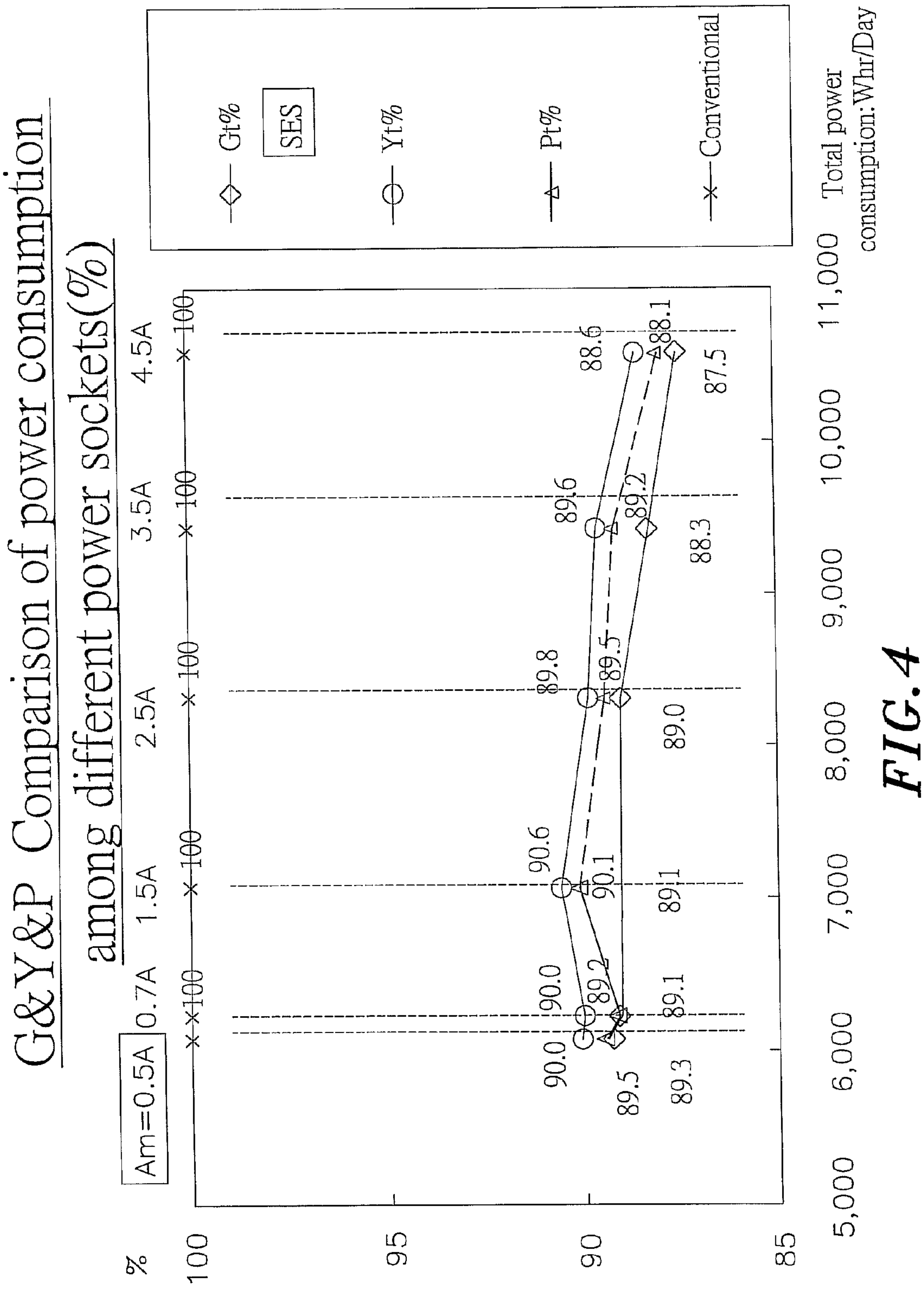
FIG. 4 is a chart showing comparison of power consumption according to the present invention.
Figure 5:
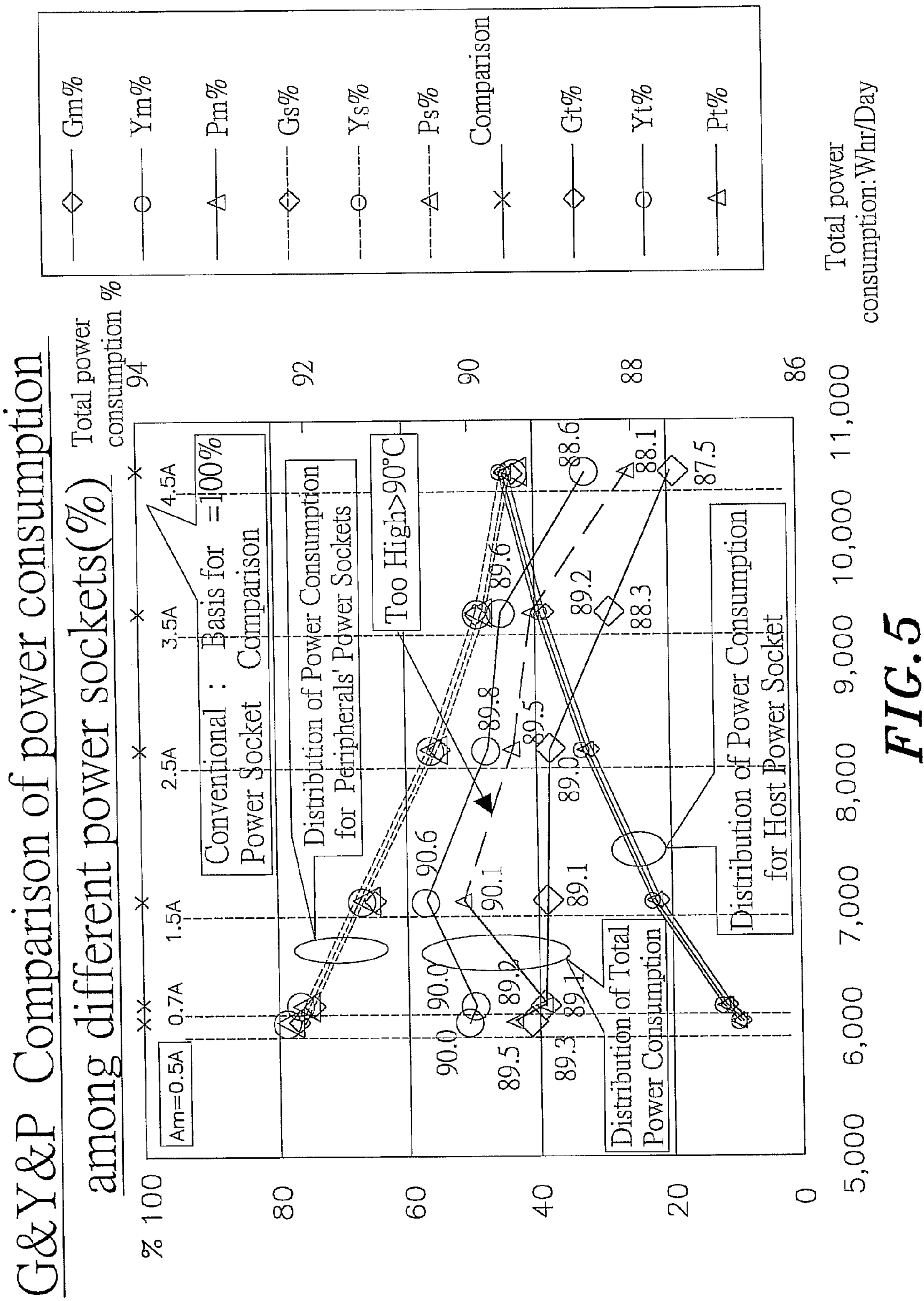
FIG. 5 is another chart showing comparison of power consumption according to the present invention.

Refer to FIGS. 1, 2 and 3, which show a perspective view of the present invention, a perspective view according to a preferred embodiment of the present invention and a simple circuit diagram of the preferred embodiment of the present invention respectively. As shown clearly in these figures, an advance power-saving power socket for power saving systems includes a socket body 1, an slave socket control loop 2 and a master socket control loop 3, wherein:

An extension cord 11 is attached to the socket body 1 for electrical connection to a given power supply, and extends from inside the socket body 1 to its surface, on which a master socket 12 and one or more slave sockets 13 are installed.

The slave socket control loop 2 includes a power input end 21 which consists of a live wire end (L) 211 and a neutral wire end (N) 212. The live wire end (L) 211 is connected in series with an overcurrent protection switch 213, an slave socket temperature sensitive switch 22 and a resistor 231 and light emitting diode (LED) 232 on an slave socket power-on indication loop 23, connected in parallel with a master socket power-on indication loop 314, and then connected in series to the neutral wire end (N) 212. A surge absorber 24 is connected between the live wire end (L) 211 and the neutral wire end (N) 212.

The master socket control loop 3 utilizes a master socket temperature sensitive switch 311 installed on a first loop 31 to connect in parallel with a first heater 312, an overcurrent protector 313 and a resistor 3141 and a LED 3142 on a master socket power-on indication loop 314, and then connect in series to the neutral wire end (N) 212. A surge absorber 24, and a resistor 3141 and LED 3142 are connected in parallel between the live wire end (L) 211 and neutral wire end (N) 212 at the power input end 21. The first heater 312 is connected in series to the overcurrent protector 313 electrically, and the resistor 3141 is also connected in series to the LED 3142 electrically on the master socket power-on indication loop 314. Then, the assembly of the power-saving power socket for power saving systems as disclosed in the present invention is finished.

To secure power supply from a given commercial source and provide electricity to the power input end 21 of the slave socket control loop 2, the aforesaid socket body 1 is electrically connected to a household power socket through a power plug attached to the extension cord 11; besides, the surge absorber 24 connects the live wire end (L) 211 and the neutral wire end (N) 212 on the power input end 21 and can immediately absorb abnormal high voltage that occurs on the extension cord 11 during power transmission and guide the voltage out to the neutral wire end (N) 212, thus preventing the slave and master socket control loops 2 and 3 from breaking down or being damaged by transient high voltage as a result of bad weather (thunder) or increase of power consumption.

In addition, the overcurrent protection switch 213 connected in series to the live wire end (L) 211 on the power input end 21 of the slave socket control loop 2 is a bimetallic switch (mechanical switch) that can resist electric current up to 15 A (amperes), while the slave socket temperature sensitive switch 22 and master socket temperature sensitive switch 311 on the master socket control loop 3 are bimetallic switches (mechanical switch) that can endure electric currents up to 10 A.

Furthermore, when the slave socket temperature sensitive switch 22 detects that the temperature of the first heater 312 is higher than its closed circuit temperature, it will form a closed circuit between both ends to connect one or more slave sockets 13 on the power input end 21 to the power supply and provide a flow path; when the slave socket temperature sensitive switch 22 detects that the temperature of the first heater 312 is lower than its open circuit temperature, an open circuit will be foamed between its two ends to cut off power supply to one or more slave sockets 13 on the power input end 21 and break the circuit; the closed circuit temperature of the slave socket temperature sensitive switch 22 is higher than its open circuit temperature, so as to control connection or disconnection of power supply to one or more slave sockets 13 effectively.

The master socket control loop 3, the slave socket control loop 2 and the first heater 312 can be placed into a heat insulation box to reduce heat dissipation performance from the slave socket temperature sensitive switch 22 and the master socket temperature sensitive switch 311 and retain heat energy as much as possible, and to extend the time of keeping the slave socket temperature sensitive switch 22 and master socket temperature sensitive switch 311 closed. Because there is nearly zero impedance between the two ends of the temperature sensitive switch in a closed circuit, it helps reduce power consumption (P=I×I×R) and lower the current flowing through the first heater 312, thus further achieving the energy-saving purpose.

In the present invention, the electronic circuit of the power-saving socket capitalizes on heat generated by the first heater 312 (e.g. a TRIAC, relay, resistor, heating cord, diode, enamelled wire, PPTC, integrated circuit or transistor, etc.) of the master socket control loop 3 to control the master socket temperature sensitive switch 311. When the master socket temperature sensitive switch 311 is in a closed state, other electronic circuits will be shunted, meaning that most current will flow through the master socket temperature sensitive switch 311 (as the impedance of the electronic circuit is far higher than that of the master socket temperature sensitive switch 311 in a closed state, and the amount of current that flows is in inverse proportion to impedance value). At this moment, the total power consumption of the power socket in the present invention is even much less than which only uses electronic circuits for control (refer to FIGS. 7, 8 and 9). In this sense, the power socket as disclosed in the present invention is more than a power-saving device and a green product.

Besides, the present invention proposes a method to control the master socket temperature sensitive switch 311 by utilizing the heat generated by the first heater 312. As this method does not require AC-DC voltage conversion by using transformers, rectifiers and regulators for electronic circuits to operate electronic components, as done in ordinary power sockets, it helps reduce power consumption necessary for AC-DC voltage conversion, thus reducing consumption of resources on the earth while further saving power.

Refer to FIGS. 2 and 3, which are respectively a perspective view and a simple circuit diagram according to a preferred embodiment of the present invention. As shown clearly in these figures, in the power-saving power socket for power saving systems as disclosed in the present invention, the master socket temperature sensitive switch 311, and the first heater 312 and the overcurrent protector 313 are connected in parallel onto the first loop 31 of the master socket control loop 3 of the socket body 1. The first heater 312 may be a low-impedance conductive wire, enamelled wire, metal terminal, nickel chrome wire, resistor, heating cord, integrated circuit, transistor, diode, TRIAC, relay or any other heating device with impedance that can produce heat, and its impedance value shall be calculated according to the following formula if it is a conductive wire:

$$\rho \times L/A = \Omega$$

(ρ: wire constant; L: length of the wire; A: cross sectional area of the wire; Ω: value of impedance)

Additionally, the master socket temperature sensitive switch 311 of the master socket control loop 3 may be connected in parallel to the first heater 312 of the first loop 31, and the first heater 312 can contact the master socket temperature sensitive switch 311 and the slave socket temperature sensitive switch 22 directly or through an insulated heat conductive element (which may be made of aluminum, copper or other materials that conduct heat very quickly) to allow the master socket temperature sensitive switch 311 and the slave socket temperature sensitive switch 22 to detect the temperature of the first heater 312 (any of a conductive wire, enamelled wire, metal terminal, nickel chrome wire, resistor, heating cord, integrated circuit, transistor, diode, TRIAC, PPTC, relay or any other device with impedance that can produce heat).

When the magnitude of currents flowing through the master and slave socket control loops 2 and 3 is higher than 15 amperes, the overcurrent protection switch 213 of the slave socket control loop 2 will be opened automatically into an open-circuit state, so as to prevent the power socket from being burnt up by overcurrent and enhance the operating safety of the power socket; the surge absorber 24 can immediately absorb abnormal high voltage occurring on the extension cord 11 connected to the power input end 21 and guide the voltage out to the neutral wire end (N) 212, so as to avoid the slave and master socket control loops 2 and 3 from being affected by transient high voltage, and to prevent the host 41 of electronic devices 4 connected electrically to the master socket 12 on the power-saving power socket (e.g. computer, TV set or sound system, etc) and multiple peripherals 42 (e.g. printers, scanners, loudspeakers, etc) inserted into one or more slave sockets 13 from breaking down, being burnt up or damaged.

In application of the power-saving power socket for power saving systems of the present invention, the master socket 12 and one or more slave sockets 13 on the socket body 1 can be used to connect the host 41 and the peripherals 42 of various kinds of the multiple electronic devices 4 electrically, wherein the power line of the host 41 (such as computer, TV set or sound systems, etc) is connected to the master power socket 12 electrically, while the power lines of the peripherals 42 of various kinds (e.g. printers, scanners, projector, loudspeakers, DVD players, etc, which are peripheral application devices for the host) are connected to one or more slave sockets 13 electrically. After the host 41 of the electronic devices 4 connected electrically to the master socket 12 on the socket body 1 is disconnected, the power supply in the socket body 1 is completely cut off (the current is zero). Accordingly, no power is consumed and electricity is saved.

When switched on, the host 41 of the electronic device 4 may generate a current of over 0.5 A, which flows through the first heater 312 on the first loop 31 of the master socket control loop 3, and at the time, the slave and master socket temperature sensitive switches 22 and 311 will sense the heat and temperature of the first heater 312. If the temperature of the first heater 312 is higher than 45° C., the slave socket temperature sensitive switch 22 will be closed to form a closed circuit between the power input end 21 of the slave socket control loop 2 and one or more slave sockets 13, so as to switch on and start the peripherals 42 of various kinds connected electrically to one or more slave sockets 13. If the first heater 312 continues to produce thermal energy and heat up, till its temperature is higher than 60° C., the master socket temperature sensitive switch 311 will be closed and started to shunt the current of the first heater for the energy-saving purpose and make the first heater cool down to ensure safe use of electricity.

When the host is powered off, the first heater does not generate heat, and so the slave socket temperature sensitive switch 22 on the slave socket control loop 2 and the master socket temperature sensitive switch 311 on the master socket control loop 3 will be in an open state. Since the first heater 312 and master socket 12 are connected, when the host 41 is powered on and started immediately, the slave socket temperature sensitive switch 22 begins to detect the temperature of the first heater 312, which is used to start the slave socket temperature sensitive switch 22 on the slave socket control loop 2 and the peripherals 42. When the temperature of the first heater 312 continues to rise, the master socket temperature sensitive switch 311 will be triggered to shunt the current of the first heater 312 and keep the first heater under a certain temperature, thus providing power supply to the host 41 and peripherals 42 of the electronic device 4 in a safe way.

As shown clearly in FIG. 3, which is a simple circuit diagram according to the present invention, the slave socket temperature sensitive switch 22 on the slave socket control loop 2 may also be connected in parallel to a TRIAC 324 as well as the heater 312 and overcurrent protector 313 on the first loop 31. As in FIG. 3, the triggering terminal of the TRIAC 324 is connected in series to a resistor 321, a diode 322 and a capacitor 323 of a triggering circuit module 32 of the TRIAC 324 respectively to start the slave socket control loop 2 more quickly and provide power supply to the slave sockets 13 (multiply the current flowing through the first loop 31 and the impedance of the first loop 31 to obtain a variable voltage, and the current flowing into the TRIAC gate will be obtained by making the variable voltage divided by the resistor 321 to quickly start the slave socket control loop 2 and provide power supply to the slave socket 13).

A high current flowing through the first heater 312 may also start the slave socket temperature sensitive switch 22 on the slave socket control loop 2 to switch on the slave sockets 13 and start the master socket temperature sensitive switch 311 on the master socket control loop 3, so as to shunt the current of the first heater 312 and prevent the first heater 312 and TRIAC 324 from being burnt down, as the TRIAC 324 is unlikely to produce sparks and has a longer service life when started under the condition of low voltages (roughly 3 volts).

Refer to FIGS. 4, 5, 6, 7 and 8, which show comparisons of power consumption according to one and another embodiments of the present invention, total power consumption of the present invention G including the host and peripherals within 24 hours (GP), differences in power consumption between the Y brand socket, the P brand socket and the present invention G (YP-GP and PP-GP), and comparisons of power consumption between the present invention G, the Y brand socket, the P brand socket and a power socket in conventional use (calculated by percentage). As shown clearly in these figures, for the present invention, the slave sockets 13 is started only after load startup of the master socket 12, and the power supply to the slave sockets 13 are interrupted only after load shutdown of the master socket 12. This makes loads on the slave sockets 13 consume no power in standby mode and requires no power to be consumed for AC-DC voltage conversion as done in other power-saving power sockets, thus further achieves the power saving effect in a power-saving state.

Comparisons of power consumption are made between the power-saving power sockets of the present invention (Gt, Gm, and Gs), power sockets of a conventional extension cord and power-saving power sockets manufactured by other companies (Yt, Ym and Ys; Pt, Pm and Ps) (t: total; m: master; s: slave) under the conditions of the same combination of the host and peripherals and same power requirements according to the following power consumption formula and hypothesis:

Total power consumption (Whr per day)=power consumption (*s*) of the host 41 (*m*) & peripherals 42(*Wm+s*)+active power consumption of the power socket (Whr per day)+standby power consumption of the power socket (Whr per day)

Hypothesis: power consumption of power sockets of conventional extension cord is 100 percent.

It can be seen clearly that:

the power consumption of the power-saving power socket of the present invention (Gt, Gin and Gs) is very low, accounting for 87.5 percent to 89.3 percent in the power consumption curve.

Power consumption of the power-saving power sockets (Yt, Yin and Ys; Pt, Pm and Ps) manufactured by other companies is:

Y brand power socket (Yt, Yin and Ys)=88.6 percent to 90.6 percent;

P brand power socket (Pt, Pm and Ps)=88.1 percent to 90.1 percent.

Clearly, the power consumption of the power-saving power socket G of the present invention (Gt, Gin and Gs) is much lower, indicating that the power socket as disclosed in the present invention can be used to reduce daily power consumption of the host 41 and the peripherals 42 of the electronic device 4 effectively.

A comparison of power consumption is further made between the power socket of conventional extension cord and the power-saving power socket of the present invention, wherein (the test voltage is 112 volts and the working time of the host 41 is 10 hours per day):

Standby power consumption for conventional power socket=549 Whr per day=0.55 Kwhr per day=(standby current of the host and peripherals×test voltage)×(24−working hours)=(0.05+0.3)×112×(24−10)=549 Whr per day.

Compared to standby power consumption of the power-saving power socket of the present invention G:

If the standby current of the master socket 12 is 0.05 A, its standby power consumption is 0.078 Kwhr per day=78.4 Whr per day=(standby current of the host×test voltage)×(24−working hours)=0.05×112×(24−10)=78.4 Whr per day=0.078 Kwhr per day.

If the standby current of a slave socket in a conventional power socket=0.30 A, the daily standby power consumption of peripherals (such as printers, scanners, etc) is 0.470 Kwhr per day=[standby current of the peripherals×test voltage×(24−working hours)=0.30×112×(24−10)=470 Whr per day=0.47 Kwhr per day].

Because the power-saving power sockets disclosed in the present invention can cut off the power supply to the peripherals completely, they can save power of 470 Whr=0.47 Kwhr every day, and this is the power energy of the peripherals saved by the present invention in a standby mode.

However, the above descriptions are given only to illustrate one preferred embodiment of the present invention and shall not be construed as limiting the appended patent claims of the present invention. According to the present invention, the power-saving power socket for power saving systems includes the slave socket control loop 2 and master socket control loop 3 inside the socket body 1 and enables these loops to be connected in series to the master socket 12 and one or more slave sockets 13 respectively. It makes use of the first heater 312 on the first loop 31 of the master socket control loop 3 to detect the current of the master socket 12 and produce different temperature, so as to control the slave socket temperature sensitive switch 22 of the slave socket control loop 2 and the master socket temperature sensitive switch 311 of the master socket control loop 3 that is connected in series and make these switches closed or opened. When the master socket electrically connected to the host 41 of the electronic device 4 is in a standby or power-off state, power supply to the slave socket control loop 2 will be interrupted, and power supply to one or more slave sockets 13 and the peripherals 42 of various kinds will also be interrupted as a result, thus achieving the power-saving purpose. When the host 41 of the electronic 4 is not used or standby, its peripherals 42 will be powered off to save the energy. The overcurrent protection switch 213 connected in series to the slave socket control loop 2 and master socket control loop 3 will be started to prevent the power socket from being burnt down due to overcurrent. Besides, when unstable high voltage occurs at the power input end 21, the surge absorber 24 is used to guide abnormal high voltage out to the neutral wire end 212, to prevent power socket from being burnt down. The above methods ensure that the power socket can perform its energy-saving and safety functions. It is hereby stated that all fabrications and devices capable of achieving aforesaid functions shall be covered by the present invention and the modifications and equivalent structural changes made without departing from the spirit of the present invention shall be included in the appended patent claims of the present invention.

The advance power-saving power socket for power saving systems as disclosed in the present invention has the advantages in practical application as follows:

(1) The master socket 12 on the socket body 1 of the power socket is used to connect the host 14 of the electronic device 4 electrically, while one or more slave sockets 13 are used to connect the peripherals 42 of various kinds electrically. When the host 41 is in a standby or power-off state, the temperature of the first heater 312 of the master socket control loop 3 will decrease due to the decreased current flowing through the master socket 12, so as to control and open the slave socket temperature sensitive switch 22 and make an open circuit of one or more slave sockets 13, and thus interrupting power supply to the peripherals 42 of various kinds. As a result, electric power will be saved.

(2) By utilizing the characteristics of existence of impedance in electronic circuits and closed-circuit temperature of temperature sensitive switches being higher than its open-circuit temperature, plus the setting that the closed-circuit temperature of the slave socket temperature sensitive switch 22 is lower than that of the master socket temperature sensitive switch 311, when the startup current flows through the electronic circuit, it will produce a given temperature to make the slave socket temperature sensitive switch closed (closed circuit) and close (closed circuit) the master socket temperature sensitive switch afterwards. When the host works, about 1 to 3 minutes later the slave socket temperature sensitive switch will be kept closed until the host shut down and the master socket temperature sensitive switch will be kept closed for most of the time. Under such circumstance, electricity will be supplied in a closed-circuit state at nearly zero impedance (i.e. nearly zero power consumption) (when the temperature of the temperature sensitive switch is higher than its closed-circuit temperature, its two contacts will be closed with nearly zero impedance, or zero power consumption). This allows the power socket of the present invention to consume less power than the conventional power sockets that only uses electronic circuits for energy saving, making it more energy-saving and more environmental friendly.

(3) As the method of controlling temperature sensitive switches with heat generated from heaters does not require AC-DC power conversion through transformers, rectifiers and regulators to operate electronic components, as done in conventional electronic circuits, this also contributes to reduced power consumption necessary for AC-DC power consumption, and further reduces power consumption and costs while reducing consumption of resources on the earth.

Thus, the present invention is designed to highlight the temperature sensing function of a power socket, in which the slave and master socket control loops are connected in parallel into the socket body of the power-saving power socket to control the slave and master socket temperature sensitive switches and make these switches closed or opened through the first heater on the master socket control loop and changes in temperature of the first heater, thus connecting or disconnecting one or more slave sockets and controlling power supply to peripherals of electronic devices, and finally achieving the energy-saving effect. When the host of the electronic device is in a standby or power-off state, the power supply to the peripherals will be interrupted to save the power. Then the overcurrent protection switch installed in the slave socket control loop will be utilized to prevent the power socket from being burnt up by the overcurrent. This can achieve the advantages of the power socket in power saving and safety protection and enhance its practical utility. However, the above descriptions are given only to illustrate preferred embodiments of the present invention and shall not be construed as limiting the appended patent claims of the present invention. It is hereby stated that all modifications and equivalent structural changes made without departing from the spirit of the present invention shall be included in the appended patent claims of the present invention.

In summary, the power-saving power socket for power saving systems as disclosed in the present invention can achieve its functions and objects when applied practically.

What the invention claimed is:

1. An advance power-saving power socket for power saving systems, comprising a socket body, a master socket, at least one slave socket, a master socket control loop and a slave socket control loop, wherein:

the socket body comprises an extension cord connected to the external power supply, and the master socket and the slave socket are on the socket body for electrical connection to electronic devices;

the slave socket control loop comprises a slave socket temperature sensitive switch and a power input end connected with the extension cord of the socket body; the power input end is connected in series with the slave socket control loop and the slave socket, two contacts of the slave socket temperature sensitive switch on the slave socket control loop are connected in parallel with two ends of an electronic switch; the master socket control loop includes a first heater whose current is used to start up the two terminals of the electronic switch in order to accelerate startup of the slave socket control loop for supplying power to the slave socket;

the master socket control loop is connected in series with the master socket, the slave socket control loop is connected in series with the slave socket and both the master socket control loop and the slave socket control loop are connected in parallel to the power input end of the slave socket control loop;

a master socket temperature sensitive switch is on the master socket control loop and is connected in parallel with the first heater, is connected in series with the master socket; the heat of the first heater is generated by the current flows on the first heater on the master socket control loop and makes the slave and master socket temperature sensitive switches of the slave and master socket control loops closed or opened respectively, to control over closed or open circuit of the slave socket control loop and control over shunting the current of the first heater on the master socket control loop, achieving power saving in a power saving state and safe use of power.

2. The advance power-saving power socket for power saving systems according to claim 1, wherein the electronic switch is a TRIAC, whose two contacts are connected in parallel with those of the slave socket temperature sensitive switch, and the trigger terminal (TRIAC gate) is connected in series with a current-limiting resistor and connected in parallel with a first loop of the first heater; a variable voltage value is obtained by multiplying the magnitude of current flowing through the first loop and the impedance of the first loop thereof, and the current flowing into the TRIAC gate is obtained through the variable voltage value divided by resistance of the current-limiting resistor of a trigger circuit module of the electronic switch to control over startup or closing of the electronic switch, for accelerating startup of the slave socket control loop for supply power to the slave socket.

3. The advance power-saving power socket for power saving systems according to claim 1, wherein the electronic switch is a relay, whose two contacts are connected in parallel with those of the slave socket temperature sensitive switch, and a coil of the relay is connected in series with the first heater, and the current flowing through the first heater on the first loop can be utilized to activate the two contacts of the relay, in order to accelerate startup of the slave socket control loop to supply power to the slave socket.

4. The advance power-saving power socket for power saving systems according to claim 1, wherein the first heater on the first loop of the master socket control loop is one of a conductive wire, enamelled wire, metal terminal, nickel chrome wire, resistor, heating cord, integrated circuit, transistor, diode, TRIAC, PPTC or relay coil.

5. The advance power-saving power socket for power saving systems according to claim 1, wherein a closed circuit is formed between the two terminals of the slave socket temperature sensitive switch to connect the power input end with the slave socket control loop on which one or more parallel connected slave sockets are connected, when the slave socket temperature sensitive switch detects that the temperature of the first heater is higher than its closed-circuit temperature; and an open circuit is formed between the two terminals of the slave socket temperature sensitive switch to disconnect the power input end with the slave socket control loop on which one or more parallel connected slave sockets are connected, when the switch detects that the temperature of the first heater is lower than its open-circuit temperature.

6. The advance power-saving power socket for power saving systems according to claim 1, wherein a heat conductive element is used to connect the temperature sensitive switches and the first heater, so that the temperature sensitive switches can sense the temperature of the heating element, and the first heater can also directly contact the temperature sensitive switch.

7. The advance power-saving power socket for power saving systems according to claim 1, wherein the temperature sensitive switches and first heater are placed into a heat insulation box to reduce heat dissipation performance from the master and slave socket temperature sensitive switches and the first heater to extend the time of keeping the temperature sensitive switches closed, reducing the current that flows through the first heater and further achieving the energy-saving effect.

* * * * *